US012100830B2

(12) United States Patent
Lu et al.

(10) Patent No.: US 12,100,830 B2
(45) Date of Patent: Sep. 24, 2024

(54) CATHODE ADDITIVE AND PREPARATION METHOD THEREFOR, CATHODE ELECTRODE AND PREPARATION METHOD THEREFOR, AND LITHIUM ION BATTERY

(71) Applicant: NINGBO ZHILIANG NEW ENERGY CO., LTD., Zhejiang (CN)

(72) Inventors: Wei Lu, Ningbo (CN); Weihong Li, Ningbo (CN); Chaoyang Chen, Ningbo (CN); Liwei Chen, Ningbo (CN); Shaojie Han, Zhejiang (CN)

(73) Assignee: NINGBO ZHILIANG NEW ENERGY CO., LTD. (CN)

( * ) Notice: Subject to any disclaimer, the term of this patent is extended or adjusted under 35 U.S.C. 154(b) by 827 days.

(21) Appl. No.: 17/277,809

(22) PCT Filed: Sep. 28, 2018

(86) PCT No.: PCT/CN2018/108383
§ 371 (c)(1),
(2) Date: Mar. 19, 2021

(87) PCT Pub. No.: WO2020/062046
PCT Pub. Date: Apr. 2, 2020

(65) Prior Publication Data
US 2021/0351395 A1    Nov. 11, 2021

(51) Int. Cl.
*H01M 4/131* (2010.01)
*H01M 4/1391* (2010.01)
(Continued)

(52) U.S. Cl.
CPC ......... *H01M 4/131* (2013.01); *H01M 4/1391* (2013.01); *H01M 4/623* (2013.01);
(Continued)

(58) Field of Classification Search
CPC .... H01M 4/131; H01M 4/1391; H01M 4/623; H01M 10/0525; H01M 2004/021;
(Continued)

(56) References Cited

U.S. PATENT DOCUMENTS

| | | | |
|---|---|---|---|
| 2016/0145104 A1* | 5/2016 | He | H01M 4/5825 |
| | | | 423/306 |
| 2017/0149061 A1* | 5/2017 | Kim | H01M 4/366 |
| 2018/0026317 A1* | 1/2018 | Johnson | H01M 4/5825 |
| | | | 320/138 |

FOREIGN PATENT DOCUMENTS

| | | |
|---|---|---|
| CN | 104425845 A | 3/2015 |
| CN | 105024047 A | 11/2015 |

(Continued)

OTHER PUBLICATIONS

Chinese Office Action dated May 31, 2021 issued in corresponding Patent Application No. 201880001558.8 (9 pages).
(Continued)

*Primary Examiner* — Abdullah A Riyami
*Assistant Examiner* — Nader J Alhawamdeh
(74) *Attorney, Agent, or Firm* — Polsinelli PC

(57) ABSTRACT

A cathode additive, comprising, in percentage by mass, 10% to 40% of carbon-coated lithium manganese iron phosphate and an organic solvent. The carbon-coated lithium manganese iron phosphate is dispersed in the organic solvent, and the median particle diameter of the carbon-coated lithium manganese iron phosphate is 30 nm to 100 nm.

15 Claims, 10 Drawing Sheets mixing a cathode material, a cathode additive, a binder, a conductive material, and N-methylpyrrolidone to obtain a cathode slurry — S110 preparing the cathode slurry into a cathode electrode — S120

(51) Int. Cl.
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(58) Field of Classification Search
CPC ......... H01M 2004/028; H01M 10/052; H01M 4/364; H01M 4/366; H01M 4/505; H01M 4/525; H01M 4/5825; H01M 4/62; H01M 4/622; H01M 4/625; Y02E 60/10
See application file for complete search history.

(56) References Cited

FOREIGN PATENT DOCUMENTS

| | | |
|---|---|---|
| CN | 105304880 A | 2/2016 |
| CN | 105977456 A | 9/2016 |
| CN | 106129365 A | 11/2016 |
| CN | 106384807 A | 2/2017 |
| CN | 107546379 A | 1/2018 |
| EP | 2 357 693 A1 | 8/2011 |
| EP | 3 018 740 A1 | 5/2016 |
| KR | 2013-0057414 A | 5/2013 |

OTHER PUBLICATIONS

Office Action issued on Jun. 19, 2023 for corresponding Korea Application No. 10-2021-7012856 (14 pages).
Martha et al., "LiMn0.8Fe0.2PO4: An advanced Cathode Material for Rechargeable Lithium Batteries", Angew. Chem. Int. Ed. 2009, 48, pp. 8559-8563.
European Search Report dated Mar. 30, 2022 issued in corresponding Patent Application No. 18935918.5 (8 pages).
Chinese Office Action dated Jan. 26, 2021 issued in corresponding Patent Application No. 201880001558.8 (8 pages).
International Search Report dated Jun. 19, 2019 issued in corresponding Patent Application No. PCT/CN2018/108383 (3 pages).

\* cited by examiner

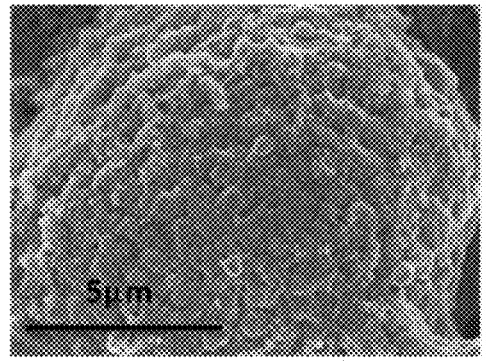
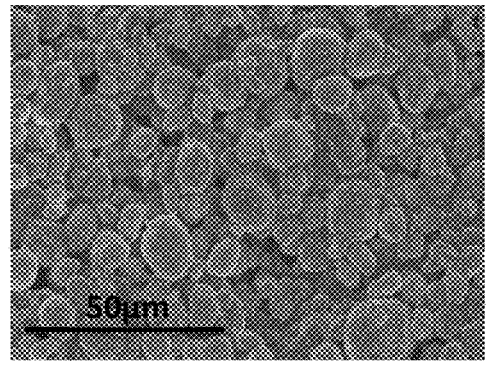
FIG. 2a                                FIG. 2b
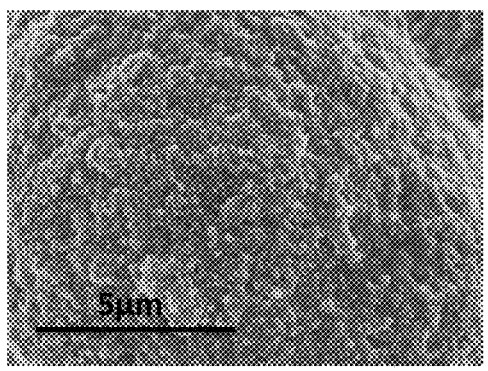
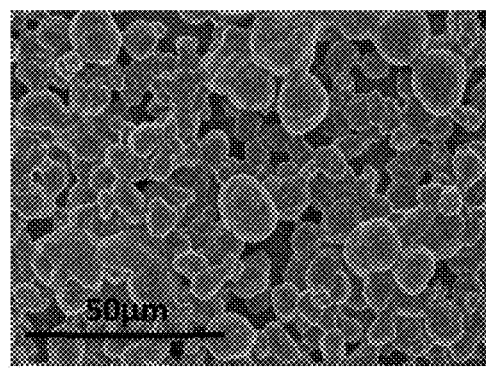
FIG. 3a                                FIG. 3b

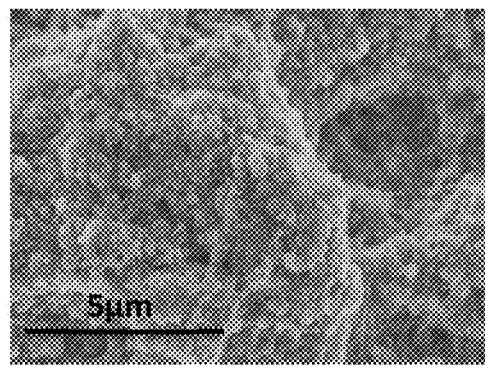 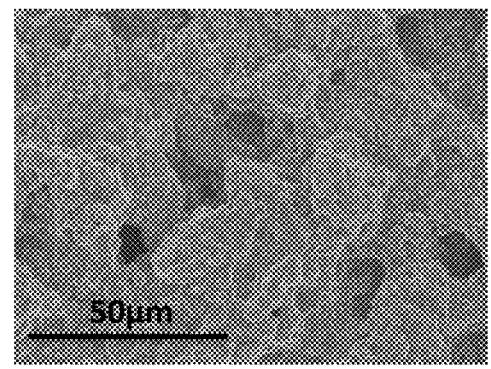
FIG. 5a            FIG. 5b
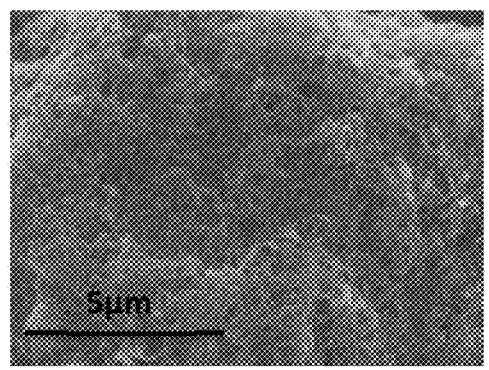 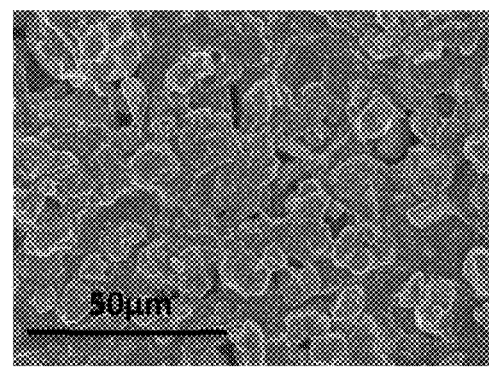
FIG. 6a            FIG. 6b
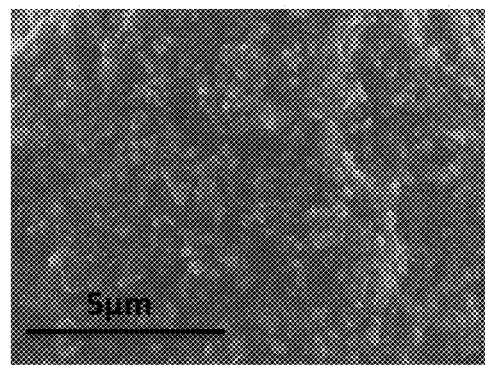 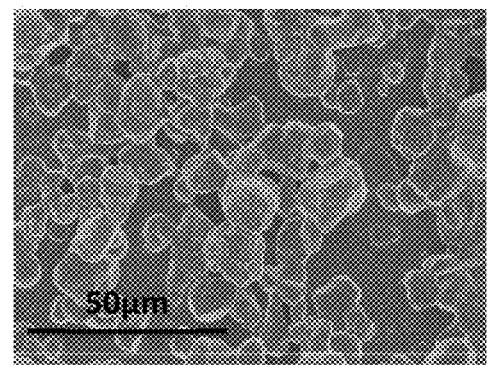
FIG. 7a            FIG. 7b

CATHODE ADDITIVE AND PREPARATION METHOD THEREFOR, CATHODE ELECTRODE AND PREPARATION METHOD THEREFOR, AND LITHIUM ION BATTERY

CROSS-REFERENCE OF THE RELATED APPLICATIONS

This application is a National Phase of International Application No. PCT/CN2018/108383, filed on Sep. 28, 2018, the contents of which are expressly incorporated by reference herein in its entirety.

TECHNICAL FIELD

The present disclosure relates to the field of lithium ion batteries, particularly to a cathode additive and a preparation method thereof, a cathode electrode and a preparation method thereof, and a lithium ion battery.

BACKGROUND

In recent years, with the rapid changes of various consumer electronics such as smart phones, tablet computers, electronic wristbands, the rapid growth of the energy-saving and environmentally-friendly electric vehicle market, and the emergence of the energy storage battery market, the market for lithium ion batteries as the power supply of these products has developed rapidly. With the explosive growth of the application fields and markets of the lithium batteries, higher requirements have been placed on the energy density of the lithium ion batteries. For this reason, people have begun to use high-voltage lithium cobaltate (charge cut-off voltage>4.3 V), high-nickel ternary materials such as $LiNi_{0.6}Co_{0.2}Mn_{0.2}O_2$, $LiNi_{0.8}Co_{0.1}Mn_{0.1}O_2$ and lithium nickel cobalt aluminate, etc. on the cathode material side of lithium ion batteries, which have been commercialized production, while people are still developing high-voltage spinel materials $LiNi_{0.5}Mn_{1.5}O_4$, lithium-rich phase cathode material, etc. The energy density of lithium ion batteries can be effectively increased by the use of these cathode materials.

The traditional lithium cobaltate material can release specific capacity of 140 mAh/g at a charge cut-off voltage=4.2 V, and the specific capacity can reach 190 mAh/g at a charge cut-off voltage=4.5 V, and the working voltage has been increased. Currently, as for the batteries in some mobile phones, the lithium cobaltate battery has been charged to 4.35 V. Additionally, in order to increase the driving mileage of electric vehicles and reduce the amount of cobalt in the battery, the current ternary materials used in the batteries of electric vehicle are shifting from NCM111 ($LiNi_{1/3}Co_{1/3}Mn_{1/3}O_2$) to NCM523 ($LiNi_{0.5}Co_{0.2}Mn_{0.3}O_2$) and further developing to NCM811 ($LiNi_{0.8}Co_{0.1}Mn_{0.1}O_2$) and NCA (lithium nickel cobalt aluminate). As the content of nickel in the cathode material increases, the specific capacity of the cathode material gradually increases, which helps to increase the energy density of batteries. At the same time, the reduction of the content of cobalt in the ternary material can also reduce the raw material cost of the cathode material. Therefore, it can be said that, currently, lithium ion battery cathode materials are developing towards high voltage and high specific capacity, including enhancing the working voltage of lithium cobaltate materials and increasing the content of nickel in cathode materials.

However, the interface between the cathode material and the organic electrolyte will be unstable after the working voltage of lithium cobaltate battery is increased, and the cathode in the high voltage state has a very high reactivity, thus the battery is prone to thermal runaway, causing combustion or explosion; while, as for ternary materials, with increasing the content of nickel, the thermal stability of the cathode material rapidly decreases, which also increases a great security hazard. When it is widely used in the power battery pack of electric vehicles, it will cause more serious consequences. Therefore, while pursuing high energy density of batteries, how to ensure the safety of batteries has become a major challenge in the lithium ion battery industry.

SUMMARY

Based on this, it is necessary to provide a cathode additive that enables lithium ion batteries to have both higher energy density and higher safety performance.

Additionally, a method for preparing a cathode additive, a cathode electrode and a preparation method thereof, and a lithium ion battery are also provided.

A cathode additive comprises, in percentage by mass, 10% to 40% carbon-coated lithium manganese iron phosphate and an organic solvent, the carbon-coated lithium manganese iron phosphate is dispersed in the organic solvent, and the median particle diameter of the carbon-coated lithium manganese iron phosphate is 30 nm to 100 nm.

A method for preparing a cathode additive comprises the following steps: dispersing carbon-coated lithium manganese iron phosphate in an organic solvent to obtain the cathode additive.

A method for preparing a cathode electrode comprises the following steps:
  mixing a cathode material, a cathode additive, a binder, a conductive material, and N-methylpyrrolidone to obtain a cathode slurry, wherein the cathode additive is the cathode additive described above or the cathode additive prepared by the method described above for preparing the cathode additive, the mass ratio of the cathode material to the carbon-coated lithium manganese iron phosphate in the cathode additive is 80:20 to 99:1; and
  preparing the cathode slurry into the cathode electrode.

A cathode electrode is prepared by the method described above for preparing a cathode electrode.

A lithium ion battery comprises the cathode electrode described above.

The details of one or more embodiments of the present disclosure are set forth in the accompanying drawings and the description below. Other features, objects and advantages of the present disclosure will become apparent from the description, the accompanying drawings, and the claims.

BRIEF DESCRIPTION OF THE DRAWINGS

To illustrate the technical solutions of the embodiments of the present disclosure or the prior art more clearly, the accompany drawings for describing the embodiments or the prior art are introduced briefly in the following. Apparently, the accompanying drawings in the following description are only some embodiments of the present disclosure, and persons of ordinary skill in the art can derive accompany drawings of the other embodiments from these accompanying drawings without any creative efforts.

FIG. 2a is a scanning electron microscope image of the cathode material on the cathode electrode prepared according to Comparative Example 6.

FIG. 2b is a scanning electron microscope image of FIG. 2a at 10 magnification.

FIG. 3a is a scanning electron microscope image of the cathode material on the cathode electrode prepared according to Example 20.

FIG. 3b is a scanning electron microscope image of FIG. 3a at 10 magnification.

FIG. 5a is a scanning electron microscope image of the cathode material on the cathode electrode prepared according to Example 26.

FIG. 5b is a scanning electron microscope image of FIG. 5a at 10 magnification.

FIG. 6a is a scanning electron microscope image of the cathode material on the cathode electrode prepared according to Comparative Example 8.

FIG. 6b is a scanning electron microscope image of FIG. 6a at 10 magnification.

FIG. 7a is a scanning electron microscope image of the cathode material on the cathode electrode prepared according to Example 27.

FIG. 7b is a scanning electron microscope image of FIG. 7a at 10 magnification.

DETAILED DESCRIPTION OF THE EMBODIMENTS

Figure 1:
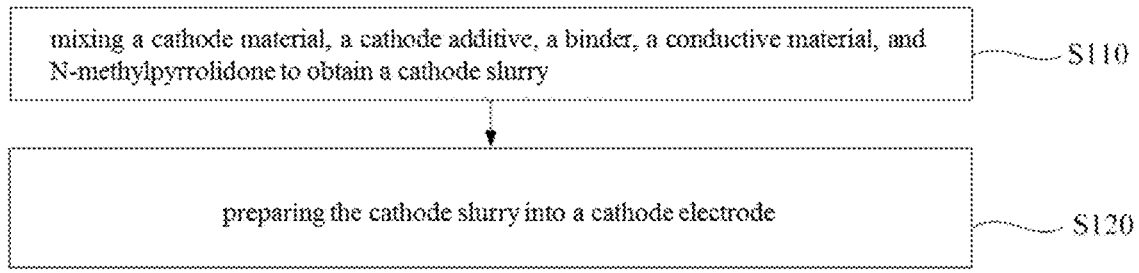
FIG. 1 is a flowchart of a method for preparing a cathode electrode according to an embodiment.

For the convenience of understanding the present disclosure, embodiments of the disclosure are described more fully hereinafter with reference to the accompanying drawings.

In one embodiment, a cathode additive is a dispersion liquid of lithium manganese iron phosphate, which comprises, in percentage by mass, 10% to 40% carbon-coated lithium manganese iron phosphate (LMFP) and an organic solvent, and the carbon-coated lithium manganese iron phosphate is dispersed in the organic solvent.

Wherein, the median particle diameter ($D_{50}$) of the carbon-coated lithium manganese iron phosphate is 30 nm to 100 nm. If the median particle diameter of the carbon-coated lithium manganese iron phosphate is greater than 100 nm, the cathode material cannot be coated well, which will affect the specific capacity of the cathode material, resulting in a lower specific capacity of the cathode material. The carbon-coated lithium manganese iron phosphate can be purchased commercially. Generally, the mass percentage of carbon in the carbon-coated lithium manganese iron phosphate is 2% to 15%.

Wherein, the organic solvent may be an organic solvent commonly used in the art. Specifically, the organic solvent is at least one selected from the group consisting of N-methylpyrrolidone (NMP) and N, N-dimethylformamide (DMF).

In one of the embodiments, the preparation steps of the cathode additive includes: dispersing the carbon-coated lithium manganese iron phosphate in an organic solvent to obtain a dispersion liquid of the carbon-coated lithium manganese iron phosphate, thereby obtaining the cathode additive. Specifically, by grinding the carbon-coated lithium manganese iron phosphate in an organic solvent, the carbon-coated lithium manganese iron phosphate is dispersed in the organic solvent to form the dispersion liquid. That is, the agglomerated carbon-coated lithium manganese iron phosphate is dispersed by grinding, so that the carbon-coated lithium manganese iron phosphate in the cathode additive becomes primary particles, that is, the median particle diameter ($D_{50}$) is 30 nm to 100 nm.

Furthermore, the median particle diameter ($D_{50}$) of the carbon-coated lithium manganese iron phosphate is 60 nm to 80 nm. If the particle diameter of the carbon-coated lithium manganese iron phosphate is too small, the cost is high, and the production cost of the cathode material is increased. The carbon-coated lithium manganese iron phosphate in this particle diameter range can not only ensure that the cathode additive has a suitable cost, but also can coat the cathode material well, and make the cathode material have a higher specific capacity.

Further, the cathode additive also includes a binder with a mass percentage of less than 2%. Too much binder will affect the electrical properties of the cathode materials. Wherein, the binder may be a binder commonly used in the art. Specifically, the binder is polyvinylidene fluoride (PVDF) or styrene butadiene rubber (SBR). At this time, the cathode additive is prepared by the following steps: mixing the binder and the organic solvent with stirring until they are completely dissolved, and then adding carbon-coated lithium manganese iron phosphate to obtain the cathode additive.

Further, the cathode additive also includes an inorganic material with a mass percentage of less than 0.5%. The inorganic material is at least one selected from the group consisting of nano-aluminum oxide, nano-titanium oxide, and nano-magnesium oxide, and these inorganic materials are inert metal oxide materials. The above content of the inorganic material may effectively block the reactions between the cathode material and the electrolyte, and can further improve safety and reliability. However, too much inorganic material will affect the performance of the specific capacity of the cathode material. At this time, when preparing the cathode additive, the inorganic material is also added in the step of adding carbon-coated lithium manganese iron phosphate.

Furthermore, the mass ratio of the inorganic material to the carbon-coated lithium manganese iron phosphate is less than 1:20. If there is too much the inorganic material, it will lead to the poor electrical conductivity of the cathode material, resulting in the lower specific capacity of the cathode material.

Further, the cathode additive also includes a conductive agent with a mass percentage of less than 10%. Too much conductive agent will reduce the content of active material and cause a decrease in capacity. Wherein, the conductive agent may be a conductive agent commonly used in the art. Specifically, the conductive agent is at least one selected from the group consisting of acetylene black, Ketjen black, graphene and carbon nanotube, which are all nanocarbon and are commonly used conductive agents for lithium ion batteries. Therefore, these substances are also used as conductive agents in the cathode additives. At this time, when preparing the cathode additive, a conductive agent is also added in the step of adding carbon-coated lithium manganese iron phosphate.

Further, the mass percentage of solid in the cathode additive is 10% to 45%. The cathode additive with this solid content is moderately viscous. If the concentration is too high, the cathode additive has poor fluidity and is not easy to use; if the concentration is too low, the cathode additive will be used too much in the later stage, resulting in a waste of solvent, thus it is uneconomical. Further, the mass percentage of solids in the cathode additive is 25% to 30%.

The above-mentioned cathode additive has at least the following advantages:

(1) It is found via experiments that the cathode additive of the above formula is added to the cathode material and together with the cathode material to make a cathode electrode, which not only reduces the direct contact area between the cathode material on the cathode electrode and the electrolyte, to reduce adverse reactions between the cathode material and the electrolyte and thus reducing the dissolution of the transition metal ions in the cathode material into the electrolyte, but also can even reduce the possibility of dangers, such as burning, exploding, and the like, of lithium ion battery, under extreme conditions such as puncture, short-circuit, overcharge, and high temperature occurred in the lithium ion battery, so that the lithium ion battery has a higher safety performance, while it can also ensure that the cathode material has a higher specific capacity and a rate performance, so that the lithium ion battery has a higher energy density.

(2) The carbon-coated lithium manganese iron phosphate can be better dispersed in the organic solvent through adding a binder to the cathode additive, and it is not easy to settle in the organic solvent, reducing the weighing error during mixing cathode slurry.

(3) Mixing the carbon-coated lithium manganese iron phosphate and a conductive agent uniformly through adding the conductive agent to the cathode additive can improve the electrical conductivity of the carbon-coated lithium manganese iron phosphate material itself, thereby increasing the specific capacity of the cathode material.

As shown in FIG. 1, a method for preparing a cathode electrode according to an embodiment includes the following steps:

Step S110: mixing a cathode material, a cathode additive, a binder, a conductive material, and N-methylpyrrolidone to obtain a cathode slurry.

In one of the embodiments, Step S110 includes: under the condition of continuous stirring, mixing the binder with the N-methylpyrrolidone, and adding the conductive material, the cathode additive and the cathode material successively, to mix the cathode slurry more uniformly.

It should be noted that Step S110 is not limited to the above step. For example, in another embodiment, the cathode material, the cathode additive, the binder, the conductive material, and N-methylpyrrolidone may be directly stirred and mixed.

Wherein, the cathode material may be a commonly used cathode material in the art. Specifically, the cathode material is at least one selected from the group consisting of a nickel cobalt manganese ternary material (NCM), a nickel cobalt aluminum ternary material (NCA), lithium manganate ($LiMn_2O_4$) and lithium cobaltate ($LiCoO_2$).

Wherein, the general structural formula of the nickel cobalt manganese ternary material is $LiNi_{1-y-z}Co_yMn_zO_2$, where $0<y<1$, $0<z<1$, $y+z<1$.

Wherein, the general structural formula of lithium nickel cobalt aluminate ternary material (NCA) is $LiNi_{1-y-z}Co_yAl_zO_2$, where $0<y<1$, $0<z<1$, $y+z<1$, $1-y-z>0.8$.

Further, the median particle diameter of the cathode material is 3 μm to 20 μm.

Wherein, the cathode additive is the aforementioned cathode additive, which will not be further described here. The mass ratio of the cathode material to the carbon-coated lithium manganese iron phosphate in the cathode additive is 80:20 to 99:1. If the mass ratio of the cathode material to the carbon-coated lithium manganese iron phosphate in the cathode additive is greater than 99:1, it cannot provide sufficient safety, and if the mass ratio thereof is less than 80:20, the production cost of the cathode electrode is too high, and will result in a low compaction of the cathode electrode. When the usage amount of the additive is between 60:40 to 80:20, it can also improve the safety, but it will cause a decrease in energy density.

Wherein, the binder may be a binder commonly used in the art. Specifically, the binder is polyvinylidene fluoride.

Wherein, the conductive material may be a conductive agent commonly used in the art. The conductive material is composed of acetylene black and carbon nanotube with a mass ratio of 1:0.1~1:2. If the mass ratio of the cathode material to the carbon-coated lithium manganese iron phosphate in the cathode additive is greater than 99:1, it cannot provide sufficient safety, and if the mass ratio thereof is less than 80:20, the production cost of the cathode electrode is too high, and will result in a low compaction of the cathode electrode. When the usage amount of the additive is between 60:40 to 80:20, it can also improve the safety, but it will cause a decrease in energy density.

Wherein, N-methylpyrrolidone is the organic solvent.

Further, the mass ratio of the total amount of the cathode material and the carbon-coated lithium manganese iron phosphate in the cathode additive to the binder and the conductive material is (94 to 98.49):(1.5 to 3):(0.01 to 3).

Step S120: preparing the cathode slurry into a cathode electrode.

Specifically, the step of preparing the cathode slurry into a cathode electrode includes: coating the cathode slurry on a current collector and then drying to obtain a cathode electrode. The current collector may be a cathode current collector commonly used in the art, such as aluminum foil, nickel foam, and the like.

The above-mentioned method for preparing a cathode electrode has at least the following advantages:

(1) The above-mentioned method for preparing a cathode electrode has simple operation and is easy for industrial production.

(2) The above-mentioned method for preparing a cathode electrode, through making the cathode additive of the above formula, and the cathode material, the binder, the conductive material and N-methylpyrrolidone together to prepare a cathode slurry, and then making the cathode slurry into a cathode electrode, results in that the direct contact area between the cathode material on the cathode electrode and the electrolyte is less, reducing adverse reactions between the cathode material and the electrolyte and thus reducing the dissolution of the metal ions in the cathode material into the electrolyte, and can even reduce the possibility of dangers, such as burning, exploding, and the like, of lithium ion battery, under extreme conditions such as puncture, short-circuit, overcharge, and high temperature occurred in the lithium ion battery, so that the lithium ion battery has a higher safety performance, while it can also make the cathode have a higher specific capacity and a rate performance, so that the lithium ion battery has a higher energy density.

In one embodiment, a cathode electrode is prepared by the method described above for preparing a cathode electrode. The cathode electrode not only has a higher specific capacity and a higher rate performance, which is beneficial to increase the energy density of the lithium ion battery, but also has a better cycle performance, which is beneficial to improve the cycle life and safety performance of the lithium ion battery.

In one embodiment, a lithium ion battery includes the above-mentioned cathode electrode. The lithium ion battery has a higher energy density, a longer cycle life and a better safety performance.

The following is the part of the specific examples (the following examples do not contain any other unspecified component other than the unavoidable impurities unless otherwise specified):

Examples 1 to 10

The preparation process of the cathode additives of Examples 1 to 10 are as follows:

Each raw material was weighed, in percentage by mass, according to Table 1; a binder and an organic solvent were mechanically stirred and mixed for 1 hour to obtain a premixed solution, then the carbon-coated lithium manganese iron phosphate, an inorganic material and a conductive agent were added into the premixed solution, the mixture was mechanically stirred for 0.5 hours, and then ground in a sand mill for 2 hours, to disperse lithium manganese iron phosphate, the inorganic material and the conductive agent in the premixed solution to obtain a cathode additive. Wherein, the mass percentages of carbon in the carbon-coated lithium manganese iron phosphate used in Examples 1-10 are shown in Table 2.

TABLE 1

| Example | Carbon-coated lithium manganese iron phosphate | | Inorganic material | | Binder | | Conductive agent | | | Solid content |
|---|---|---|---|---|---|---|---|---|---|---|
| | Median particle diameter (nm) | Content (%) | Material | Content (%) | Material | Content (%) | Material | Content (%) | Organic solvent | (wt %) of cathode additive |
| Example 1 | 30 | 10 | nano-aluminium oxide | 0.2 | PVDF | 2.0 | graphene | 0.01 | NMP | 12.21 |
| Example 2 | 60 | 20 | nano-titanium oxide | 0.01 | PVDF | 0.01 | carbon nanotube | 1 | NMP | 21.02 |
| Example 3 | 80 | 30 | nano-magnesium oxide | 0.5 | SBR | 0.5 | Ketjen black | 0.5 | DMF | 31.5 |
| Example 4 | 100 | 40 | nano-aluminium oxide:nano-titanium oxide = 1:1 | 0.1 | SBR | 1 | acetylene black | 2 | DMF | 43.1 |
| Example 5 | 60 | 25 | nano-titanium oxide:nano-aluminium oxide:nano-magnesium oxide = 1:3:6 | 0.4 | PVDF | 0.8 | acetylene black | 2 | NMP | 28.2 |
| Example 6 | 65 | 27 | nano-aluminium oxide | 0.1 | PVDF | 0.1 | carbon nanotube graphene = 1:1 | 1 | NMP | 28.2 |
| Example 7 | 70 | 27 | nano-titanium oxide | 0.2 | PVDF | 0.2 | carbon nanotube | 0.2 | NMP | 27.6 |
| Example 8 | 60 | 28 | nano-titanium oxide | 0.05 | SBR | 0.8 | Ketjen black | 0.6 | DMF | 29.45 |
| Example 9 | 60 | 25 | nano-magnesium oxide | 0.2 | SBR | 0.6 | graphene | 0.1 | DMF | 25.9 |
| Example 10 | 60 | 25 | nano-aluminium oxide | 0.2 | PVDF | 0.3 | acetylene black | 0.5 | DMF:NMP = 1:2 | 26 |

TABLE 1-continued

| Example | Carbon-coated lithium manganese iron phosphate | | Inorganic material | | Binder | | Conductive agent | | Organic solvent | Solid content (wt %) of cathode additive |
|---|---|---|---|---|---|---|---|---|---|---|
| | Median particle diameter (nm) | Content (%) | Material | Content (%) | Material | Content (%) | Material | Content (%) | | |
| Example 11 | 70 | 27 | — | — | — | — | — | — | NMP | 27 |
| Example 12 | 70 | 27 | nano-titanium oxide | 0.2 | — | — | — | — | NMP | 27.2 |
| Example 13 | 70 | 27 | — | — | PVDF | 0.4 | — | — | NMP | 27.4 |
| Example 14 | 70 | 27 | — | — | — | — | carbon nanotube | 0.2 | NMP | 27.2 |
| Example 15 | 70 | 27 | nano-titanium oxide | 0.2 | PVDF | 0.4 | — | — | NMP | 27.6 |
| Example 16 | 70 | 27 | nano-titanium oxide | 0.2 | — | — | carbon nanotube | 0.2 | NMP | 27.4 |
| Example 17 | 70 | 20 | nano-titanium oxide | 0.01 | PVDF | 0.01 | carbon nanotube | 5.78 | NMP | 25.8 |
| Example 18 | 70 | 18 | nano-titanium oxide | 0.05 | PVDF | 0.03 | carbon nanotube | 10 | NMP | 28.08 |

Wherein, the "—" in Table 1 represents that the material is not present or the content of the material is 0; and in the column of "Material" of the inorganic material in Table 1, nano-aluminium oxide:nano-titanium oxide = 1:1, and nano-titanium oxide:nano-aluminium oxide:nano-magnesium oxide = 1:3:6, represent the mass ratio, in the column of "Material" of the conductive agent, carbon nanotube:graphene = 1:1 represents the mass ratio, and in the column of "Organic solvent", DMF:NMP = 1:2 represents the mass ratio.

TABLE 2

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Carbon content (wt %) | 9 | 5 | 8 | 4 | 2 | 7 | 15 | 8 | 13 | 10 |

Example 11

The preparation process of the cathode additive of this example is roughly the same as that of Example 7, the difference is that, the preparation of the cathode additive in step (1) of this example is different. The cathode additive of this example does not contain an inorganic material, a binder and a conductive agent, the preparation process is as follows:

Each raw material was weighed, in percentage by mass, according to Table 1; an organic solvent and the carbon-coated lithium manganese iron phosphate were mechanically stirred and mixed for 0.5 hours, and then ground in a sand mill for 2 hours, to obtain a cathode additive. Wherein, the mass percentage of carbon in the carbon-coated lithium manganese iron phosphate used in this example is the same as that of Example 7.

Example 12

The preparation process of the cathode additive of this example is roughly the same as that of Example 7, the difference is that, the preparation of the cathode additive in step (1) of this example is different. The cathode additive of this example does not contain a conductive agent and a binder, the preparation process is as follows:

Each raw material was weighed, in percentage by mass, according to Table 1; the carbon-coated lithium manganese iron phosphate and an inorganic material were added to an organic solvent, the mixture was mechanically stirred for 0.5 hours, and then ground in a sand mill for 2 hours, to obtain a cathode additive. Wherein, the mass percentage of carbon in the carbon-coated lithium manganese iron phosphate used in this example is the same as that of Example 7.

Example 13

The preparation process of the cathode additive of this example is roughly the same as that of Example 7, the difference is that, the preparation of the cathode additive in step (1) of this example is different. The cathode additive of this example does not contain an inorganic material and a conductive agent, the preparation process is as follows:

Each raw material was weighed, in percentage by mass, according to Table 1; a binder and an organic solvent were mechanically stirred and mixed for 1 hour to obtain a premixed solution, then the carbon-coated lithium manganese iron phosphate was added to the premixed solution, the mixture was mechanically stirred for 0.5 hours, and then ground in a sand mill for 2 hours, to obtain a cathode additive. Wherein, the mass percentage of carbon in the carbon-coated lithium manganese iron phosphate used in this example is the same as that of Example 7.

Example 14

The preparation process of the cathode additive of this example is roughly the same as that of Example 7, the difference is that, the preparation of the cathode additive in step (1) of this example is different. The cathode additive of this example does not contain an inorganic material and a binder, the preparation process is as follows:

Each raw material was weighed, in percentage by mass, according to Table 1; a conductive agent and the carbon-coated lithium manganese iron phosphate were added to a premixed solution, then the mixture was mechanically stirred for 0.5 hours, and then ground in a sand mill for 2 hours, to obtain a cathode additive. Wherein, the mass percentage of carbon in the carbon-coated lithium manganese iron phosphate used in this example is the same as that of Example 7.

Example 15

The preparation process of the cathode additive of this example is roughly the same as that of Example 7, the difference is that, the preparation of the cathode additive in step (1) of this example is different. The cathode additive of this example does not contain a conductive agent, the preparation process is as follows:

Each raw material was weighed, in percentage by mass, according to Table 1; a binder and an organic solvent were mechanically stirred and mixed for 1 hour to obtain a premixed solution, then an inorganic material and the carbon-coated lithium manganese iron phosphate were added into the premixed solution, the mixture was mechanically stirred for 0.5 hours, and then ground in a sand mill for 2 hours, to obtain a cathode additive. Wherein, the mass percentage of carbon in the carbon-coated lithium manganese iron phosphate used in this example is the same as that of Example 7.

Example 16

The preparation process of the cathode additive of this example is roughly the same as that of Example 7, the difference is that, the preparation of the cathode additive in step (1) of this example is different. The cathode additive of this example does not contain a binder, the preparation process is as follows:

Each raw material was weighed, in percentage by mass, according to Table 1; the carbon-coated lithium manganese iron phosphate, an inorganic material and a conductive agent were added to an organic solvent, the mixture was mechanically stirred for 0.5 hours, and then ground in a sand mill for 2 hours, to obtain a cathode additive. Wherein, the mass percentage of carbon in the carbon-coated lithium manganese iron phosphate used in this example is the same as that of Example 7.

Examples 17 and 18

The preparation process of the cathode additive of Example 17 and Example 18 is roughly the same as that of Example 7, the difference is that, the mass percentage of each raw material is different. Wherein, the preparation processes of the cathode additive of Example 17 and Example 18 are shown in Table 1, the mass percentages of carbon in the carbon-coated lithium manganese iron phosphate used in Example 17 and Example 18 are the same as that in Example 7.

Comparative Example 1

The preparation process of the cathode additive of Comparative Example 1 is roughly the same as that of Example 1, the difference is that, the preparation of the cathode additive in step (1) of this example is different. The cathode additive of this example does not contain the carbon-coated lithium manganese iron phosphate. In this case, in the cathode additive, the mass percentage of the inorganic material is 10.2%, the mass percentage of the binder is 1.5%, the mass percentage of the conductive agent is 0.01%, and the solid content of the cathode additive is 11.71 wt %. Wherein, the mass percentage of carbon in the carbon-coated lithium manganese iron phosphate used in this example is the same as that of Example 1.

Examples 19 to 34

The preparation processes of the cathode electrodes of Examples 19 to 34 are as follows:

According to the specific materials and proportions in Table 3, a binder and N-methylpyrrolidone were stirred and mixed for 30 minutes, then a conductive material was added under continuous stirring, after stirring and mixing for 30 minutes, the cathode additive prepared from Examples 1 to 18 was added, then the mixture was stirred and mixed for 30 minutes and then the cathode material was added, the mixture was finally stirred and mixed for 12 hours, to obtain a cathode slurry. The cathode slurry was coated on a current collector and dried at 110° C., to obtain a cathode electrode. Wherein, the particle diameters of the cathode materials of Examples 19-28 are as shown in Table 3, and the particle diameters of the cathode materials of Examples 29 to 36 are the same as that of Example 25.

In Table 3, A represents the mass of the cathode material, and B represents the mass of the carbon-coated lithium manganese iron phosphate in the cathode additive. Then, the sum of the mass of the cathode material and the carbon-coated lithium manganese iron phosphate in the cathode additive is recorded as A+B, the mass ratio of the cathode material to the carbon-coated lithium manganese iron phosphate in the cathode additive is recorded as A:B; C represents the mass of the binder, D represents the mass of the conductive material, (A+B):C:D represents the mass ratio of the three, the total amount of the cathode material and the carbon-coated lithium manganese iron phosphate in the cathode additive, the binder, and the conductive material.

TABLE 3

| | Cathode material | Cathode additive | Binder | Conductive material | A:B | (A + B):C:D |
|---|---|---|---|---|---|---|
| Example 19 | NCM (523) | Example 1 | PVDF | acetylene black and carbon nanotube with a mass ratio of 1:2 | 99:1 | 95:2.5:2.5 |
| Example 20 | NCM (523) | Example 2 | PVDF | acetylene black and carbon nanotube with a mass ratio of 1:2 | 93:7 | 97:1.5:1.5 |

TABLE 3-continued

|  | Cathode material | Cathode additive | Binder | Conductive material | A:B | (A + B):C:D |
|---|---|---|---|---|---|---|
| Example 21 | NCM (622) | Example 3 | PVDF | acetylene black and carbon nanotube with a mass ratio of 1:2 | 90:10 | 96:2:2 |
| Example 22 | NCM (523) and $LiCoO_2$ with a mass ratio of 1:1 | Example 4 | PVDF | acetylene black and carbon nanotube with a mass ratio of 1:2 | 88:12 | 97:2:1 |
| Example 23 | NCM (811) | Example 5 | PVDF | acetylene black and carbon nanotube with a mass ratio of 1:2 | 90:10 | 95:3:2 |
| Example 24 | NCM (622) and $LiMn_2O_4$ with a mass ratio of 1:1 | Example 6 | PVDF | acetylene black and carbon nanotube with a mass ratio of 1:2 | 85:15 | 97:1:2 |
| Example 25 | $LiNi_{0.8}Co_{0.15}Al_{0.05}O_2$ | Example 7 | PVDF | acetylene black and carbon nanotube with a mass ratio of 1:2 | 88:12 | 97:1.5:1.5 |
| Example 26 | $LiMn_2O_4$ | Example 8 | PVDF | acetylene black and carbon nanotube with a mass ratio of 1:2 | 93:7 | 97:1.5:1.5 |
| Example 27 | $LiCoO_2$ | Example 9 | PVDF | acetylene black and carbon nanotube with a mass ratio of 1:2 | 90:10 | 97:2:1 |
| Example 28 | $LiMn_2O_4$ | Example 10 | PVDF | acetylene black and carbon nanotube with a mass ratio of 1:2 | 80:20 | 94:3:3 |
| Example 29 | $LiNi_{0.8}Co_{0.15}Al_{0.05}O_2$ | Example 11 | PVDF | acetylene black and carbon nanotube with a mass ratio of 1:2 | 88:12 | 97:1.5:1.5 |
| Example 30 | $LiNi_{0.8}Co_{0.15}Al_{0.05}O_2$ | Example 12 | PVDF | acetylene black and carbon nanotube with a mass ratio of 1:2 | 88:12 | 97:1.5:1.5 |
| Example 31 | $LiNi_{0.8}Co_{0.15}Al_{0.05}O_2$ | Example 13 | PVDF | acetylene black and carbon nanotube with a mass ratio of 1:2 | 88:12 | 97:1.5:1.5 |
| Example 32 | $LiNi_{0.8}Co_{0.15}Al_{0.05}O_2$ | Example 14 | PVDF | acetylene black and carbon nanotube with a mass ratio of 1:2 | 88:12 | 97:1.5:1.5 |
| Example 33 | $LiNi_{0.8}Co_{0.15}Al_{0.05}O_2$ | Example 15 | PVDF | acetylene black and carbon nanotube with a mass ratio of 1:2 | 88:12 | 97:1.5:1.5 |
| Example 34 | $LiNi_{0.8}Co_{0.15}Al_{0.05}O_2$ | Example 16 | PVDF | acetylene black and carbon nanotube with a mass ratio of 1:2 | 88:12 | 97:1.5:1.5 |
| Example 35 | NCM (523) | Example 17 | PVDF | acetylene black and carbon nanotube with a mass ratio of 1:1 | 93:7 | 98:1.5:0.5 |
| Example 36 | NCM (622) | Example 18 | PVDF | acetylene black and carbon nanotube with a mass ratio of 1:0.1 | 90:10 | 98.49:1.5:0.01 |

Wherein, NCM (523) represents $LiNi_{0.5}Co_{0.3}Mn_{0.2}O_2$; NCM (622) represents $LiNi_{0.6}Co_{0.2}Mn_{0.2}O_2$; and NCM (811) represents $LiNi_{0.8}Co_{0.1}Mn_{0.1}O_2$.

TABLE 4

| | Example 19 | Example 20 | Example 21 | Example 22 | Example 23 | Example 24 | Example 25 | Example 26 | Example 27 | Example 28 |
|---|---|---|---|---|---|---|---|---|---|---|
| Particle diameter (micron) of cathode material | 10 | 12 | 3 | 20 | 8 | 15 | 18 | 5 | 6 | 14 |

Comparative Example 2

The preparation process of the cathode electrode of Comparative Example 2 is roughly the same as that of Example 19, the difference is that, the cathode additive of Comparative Example 1 is used for the cathode electrode of Comparative Example 2.

Comparative Example 3

The preparation process of the cathode electrode of Comparative Example 3 is as follows:

A binder and N-methylpyrrolidone were stirred and mixed for 30 minutes, then a conductive material was added under continuous stirring, after stirring and mixing for 30 minutes, nano-aluminum oxide was added, then the mixture was stirred and mixed for 30 minutes and then NCM (523) cathode material was added, the mixture was finally stirred and mixed for 12 hours, to obtain a cathode slurry. The cathode slurry was coated on a current collector and dried at 110° C., to obtain a cathode electrode. Wherein, the cathode material, binder, conductive material and N-methylpyrrolidone are the same as that in Example 20, and the addition ratio is also the same as that in Example 20. The mass ratio of the cathode material to aluminum oxide in Comparative Example 3 is 93:7, and the sum of the mass of the cathode material and aluminum oxide:the mass of the binder:the mass of the conductive material=97:1.5:1.5.

Comparative Example 4

The preparation process of the cathode electrode of Comparative Example 4 is as follows:

A binder and N-methylpyrrolidone were stirred and mixed for 30 minutes, then a conductive material was added under continuous stirring, after stirring and mixing for 30 minutes, carbon-coated lithium manganese iron phosphate was added, then the mixture was stirred and mixed for 30 minutes and then a cathode material was added, the mixture was finally stirred and mixed for 12 hours, to obtain a cathode slurry. The cathode slurry was coated on a current collector and dried at 110° C., to obtain a cathode electrode. Wherein, the cathode material, binder, conductive material and N-methylpyrrolidone are the same as that in Example 20, and the addition ratio is also the same as that in Example 20. The mass ratio of the cathode material to the carbon-coated lithium manganese iron phosphate in Comparative Example 4 is 93:7, and the sum of the mass of the cathode material and aluminum oxide:the mass of the binder:the mass of the conductive material=97:1.5:1.5.

Comparative Example 5

The preparation process of the cathode electrode of Comparative Example 5 is as follows:

The carbon-coated lithium manganese iron phosphate and NCM (523) were mechanically fused at a mass ratio of 93:7 for 15 minutes, then a conductive agent and a binder were added, and then the mechanical fusion was continued for 15 minutes, to obtain a cathode active material; the binder and N-methylpyrrolidone was stirred and mixed for 30 minutes, and then the conductive material was added under continuous stirring. After stirring and mixing for 30 minutes, a cathode active material was added, the mixture was finally stirred and mixed for 12 hours, to obtain a cathode slurry. The cathode slurry was coated on a current collector and dried at 110° C., to obtain a cathode electrode. Wherein, the conductive agent and the binder of Comparative Example 5 are the same as that of Example 1. The mass ratio of the conductive agent and the carbon-coated lithium manganese iron phosphate is 1:14.3. The mass ratio of the binder to the carbon-coated lithium manganese iron phosphate is 1:19. The binder, conductive material, and N-methylpyrrolidone are the same as that in Example 20, and the addition ratio is the same as that of Example 20. In Comparative Example 5, the mass of the cathode active material: the mass of the binder: the mass of the conductive material=97:1.5:1.5.

Comparative Example 6

The preparation process of the cathode electrode of Comparative Example 6 is as follows:

A binder and N-methylpyrrolidone were stirred and mixed for 30 minutes, then a conductive material was added under continuous stirring, after stirring and mixing for 30 minutes, NCM (523) cathode material was added, the mixture was finally stirred and mixed for 12 hours, to obtain a cathode slurry. The cathode slurry was coated on a current collector and dried at 110° C., to obtain a cathode electrode. Wherein, the binder, conductive material and N-methylpyrrolidone are the same as that in Example 20, in Comparative Example 6, the mass of the cathode material:the mass of the binder: the mass of the conductive material=97:1.5:1.5.

Comparative Example 7

The preparation process of the cathode electrode of Comparative Example 7 is as follows:

A binder and N-methylpyrrolidone were stirred and mixed for 30 minutes, then a conductive material was added under continuous stirring, after stirring and mixing for 30 minutes, $LiMn_2O_4$ cathode material was added, the mixture was finally stirred and mixed for 12 hours, to obtain a cathode slurry. The cathode slurry was coated on a current collector and dried at 110° C., to obtain a cathode electrode. Wherein, the binder, conductive material and N-methylpyrrolidone are the same as that in Example 26, in Comparative Example 7, the mass of the cathode material:the mass of the binder: the mass of the conductive material=97:1.5:1.5.

Comparative Example 8

The preparation process of the cathode electrode of Comparative Example 8 is as follows:

A binder and N-methylpyrrolidone were stirred and mixed for 30 minutes, then a conductive material was added under continuous stirring, after stirring and mixing for 30 minutes, LiCoO$_2$ cathode material was added, the mixture was finally stirred and mixed for 12 hours, to obtain a cathode slurry. The cathode slurry was coated on a current collector and dried at 110° C., to obtain a cathode electrode. Wherein, the binder, conductive material and N-methylpyrrolidone are the same as that in Example 27, in Comparative Example 8, the mass of the cathode material:the mass of the binder:the mass of the conductive material=97:2:1.

Test:

1. Scanning Electron Microscope Test:

FIG. 2a is a scanning electron microscope (SEM) image of the cathode material on the cathode electrode prepared in Comparative Example 6, and FIG. 2b is a magnified view of FIG. 2a at 10 magnification. It can be seen from the figures that, the particle surface of the cathode material is coated with a layer of conductive materials, and a uniform network layer structure is formed between the conductive materials.

FIG. 3a is a (SEM) scanning electron microscope image of the cathode material on the cathode electrode prepared in Example 20, and FIG. 3b is a magnified view of FIG. 3a at 10 magnification. It can be seen from the figures that, the lithium manganese iron phosphate and the conductive agent form a uniform network layer structure, which is uniformly and densely coated on the particle surface of the cathode material, and the particle diameter of the lithium manganese iron phosphate is about 60 nm.

Figure 4A:
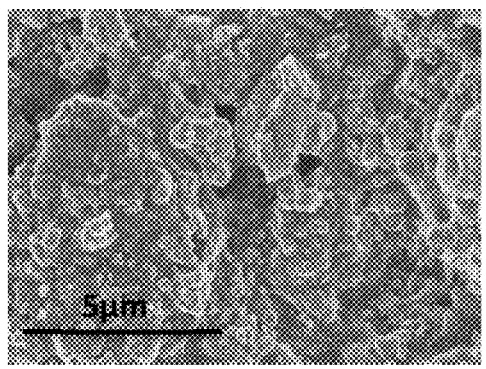
FIG. 4a is a scanning electron microscope image of the cathode material on the cathode electrode prepared according to Comparative Example 7.
Figure 4B:
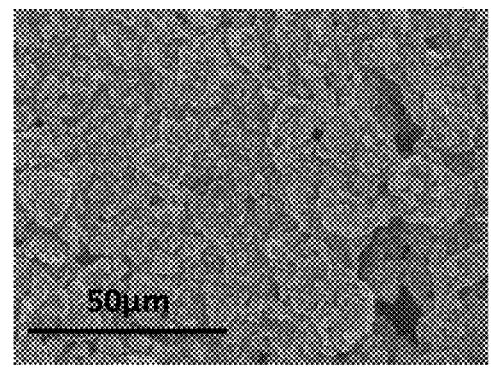
FIG. 4b is a scanning electron microscope image of FIG. 4a at 10 magnification.

FIG. 4a is a scanning electron microscope image of the cathode material on the cathode electrode prepared in Comparative Example 7, and FIG. 4b is a magnified view of FIG. 4a at 10 magnification. It can be seen from the figures that, the irregular particle surface of the cathode material is coated with a layer of conductive materials, and a uniform network layer structure is formed between the conductive materials.

FIG. 5a is a scanning electron microscope image of the cathode material on the cathode electrode prepared in Example 26, and FIG. 5b is a magnified view of FIG. 5a at 10 magnification. It can be seen from the figures that, the lithium manganese iron phosphate and the conductive agent form a uniform network layer structure, which is uniformly and densely coated on the irregular particle surface of the lithium manganate material, and the particle diameter of the lithium manganese iron phosphate is about 60 nm.

FIG. 6a is a scanning electron microscope image of the cathode material on the cathode electrode prepared in Comparative Example 8, and FIG. 6b is a magnified view of FIG. 6a at 10 magnification. It can be seen from the figures that, the spherical particle surface of the cathode material is coated with a layer of conductive materials, and a uniform network layer structure is formed between the conductive materials.

FIG. 7a is a scanning electron microscope image of the cathode material on the cathode electrode prepared in Example 27, and FIG. 7b is a magnified view of FIG. 7a at 10 magnification. It can be seen from the figures that, the lithium manganese iron phosphate particles and the conductive agent form a uniform network layer structure, which is uniformly and densely coated on the sphere-like particle surface of the cathode material; the particle diameter of the lithium manganese iron phosphate is about 60 nm.

Wherein, the cathode materials on the cathode electrodes of Examples 19, 21 to 25, and Examples 28 to 36 have morphology similar to that of Examples 20, 26, and 27, and will not be repeated here.

Figure 8:
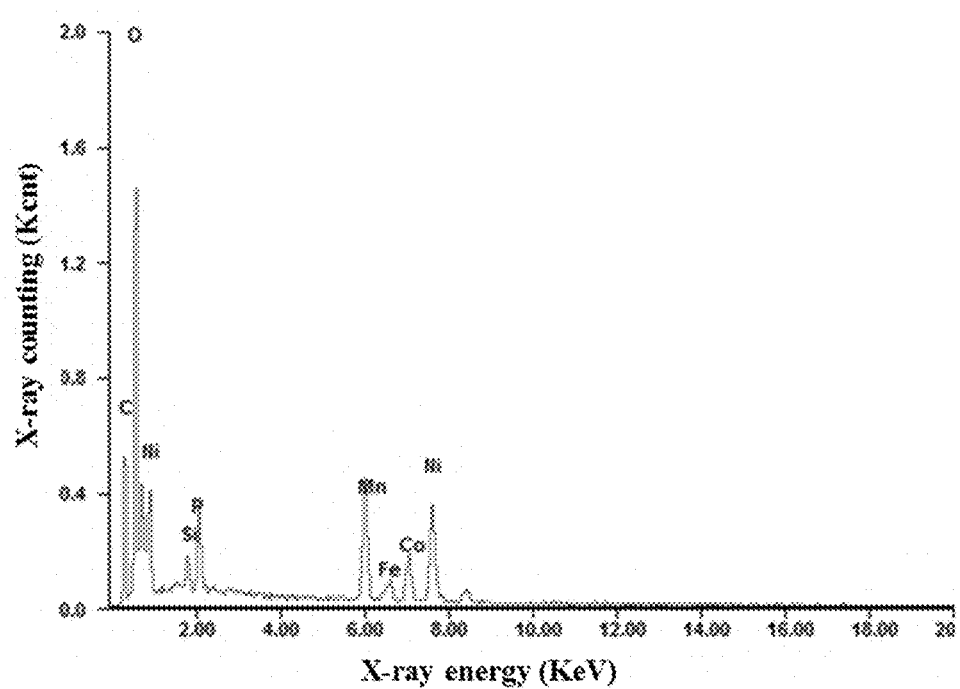
FIG. 8 is an EDX energy spectrum diagram of the cathode material on the cathode electrode prepared according to Example 20.

2. EDX Test:

FIG. 8 is an EDX energy spectrum diagram of the cathode material on the cathode electrode prepared according to Example 20. It can be seen from the figure that, the cathode material contains elements such as Ni, Co, Mn, Fe, O, P, C, and the like. These indicate that the surface of the ternary cathode material contains the component of lithium manganese iron phosphate.

Figure 9:
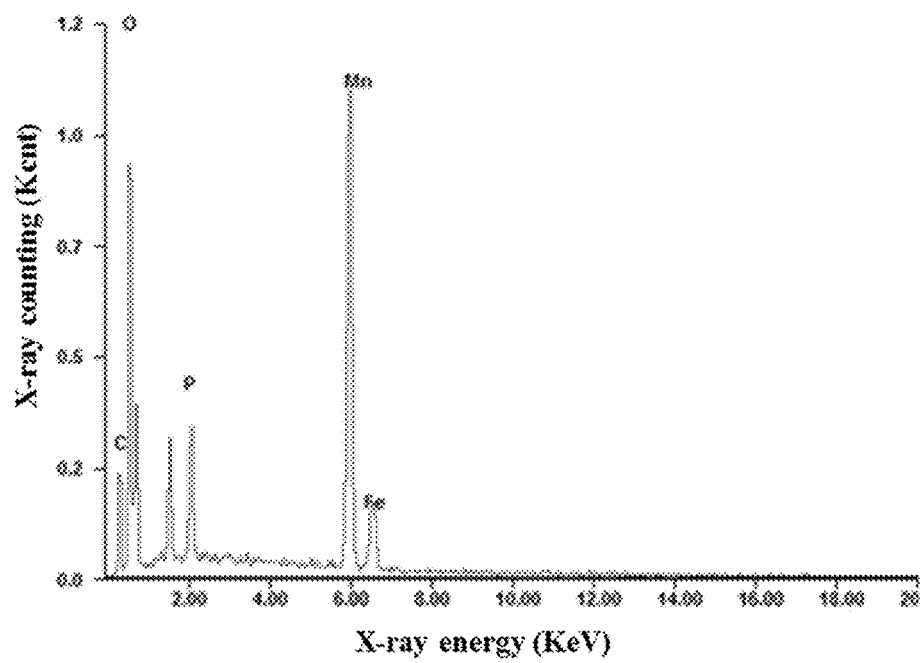
FIG. 9 is an EDX energy spectrum diagram of the cathode material on the cathode electrode prepared according to Example 26.

FIG. 9 is an EDX energy spectrum diagram of the cathode material on the cathode electrode prepared according to Example 26. It can be seen from the figure that, the cathode material contains elements such as Mn, Fe, O, P, C, and the like. These indicate that the surface of the lithium manganate cathode material contains the component of lithium manganese iron phosphate.

Figure 10:
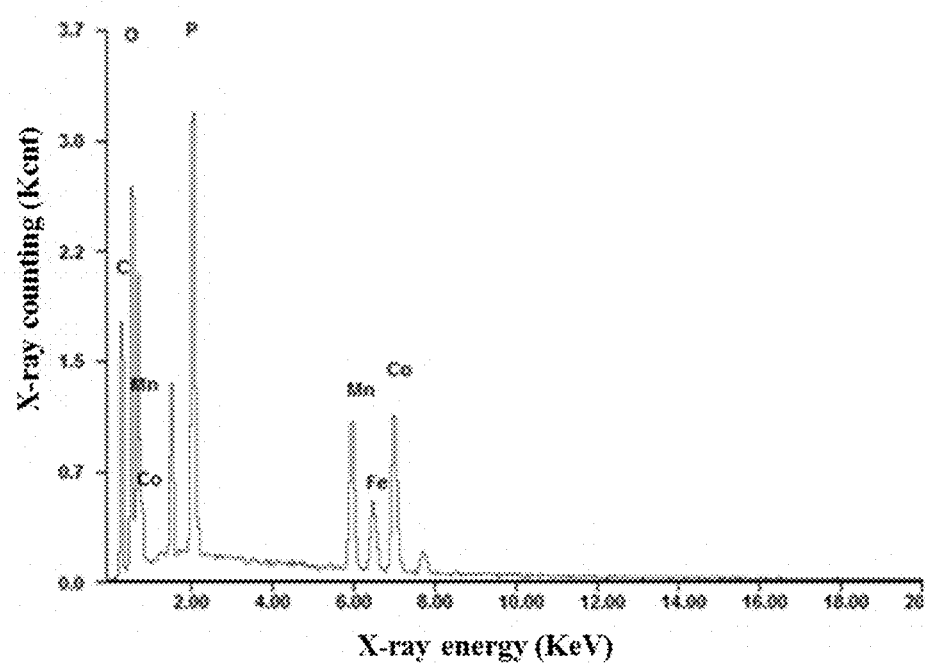
FIG. 10 is an EDX energy spectrum diagram of the cathode material on the cathode electrode prepared according to Example 27.

FIG. 10 is an EDX energy spectrum diagram of the cathode material on the cathode electrode prepared according to Example 27. It can be seen from the figure that, the cathode material contains elements such as Co, Mn, Fe, O, P, C, and the like, which indicates that the surface of the lithium cobaltate cathode material contains the component of lithium manganese iron phosphate.

Wherein, the cathode materials on the cathode electrodes of Examples 19, 21 to 25, and Examples 28 to 36 have EDX energy spectrum diagrams similar to that of Examples 20, 26, and 27, and will not be repeated here.

3. Electrical Performance Test:

The cathode electrodes of Examples 20, 26, 27 and Comparative Examples 6 to 8 were assembled into coin half-cells, in which all half-cells used lithium sheets as the anode electrode. The half-cells made from the cathode electrodes of Example 20 and Comparative Example 6 were charged and discharged at a constant current and constant voltage with a current of 0.2 C in the range of 2.75 V to 4.3 V, the half-cells made from the cathode electrodes of Example 26 and Comparative Example 7 were charged and discharged at a constant current and constant voltage with a current of 0.2 C in the range of 3.0 V to 4.3 V, and the half-cells made from the cathode electrodes of Example 27 and Comparative Example 8 were charged and discharged at a constant current and constant voltage with a current of 0.2 C in the range of 3.5 V to 4.35 V.

Figure 11:
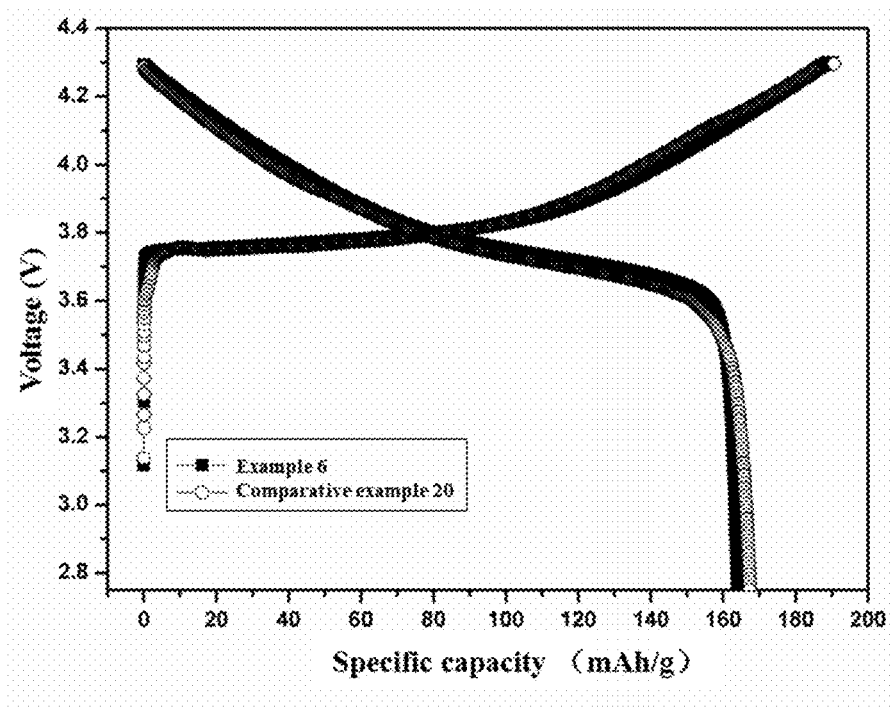
FIG. 11 is an electrical test curve chart of the coin half-cells assembled from the cathode electrode of Example 20 and Comparative Example 6.

FIG. 11 is an electrical test curve chart of the coin half-cells assembled from the cathode electrode of Example 20 and Comparative Example 6. The discharge specific capacity of the half-cells made from the cathode electrodes of Example 20 and Comparative Example 6 at a current of 0.2 C is 163.5 mAh/g and 162.8 mAh/g, respectively; this shows that the cathode additive of Example 1 does not affect the electrochemical performance of the ternary lithium ion battery. At the same time, it can be found in the figure that, the electrical curve of the half-cell made from the cathode electrode of Example 20 has a bend with a small amplitude at the voltage platform of 3.6 V~3.4 V, which should be the discharge platform of $Fe^{2+}/Fe^{3+}$ in the lithium manganese iron phosphate, because the cathode additive in Example 2 is added in a less amount and the bending amplitude is smaller.

Figure 12:
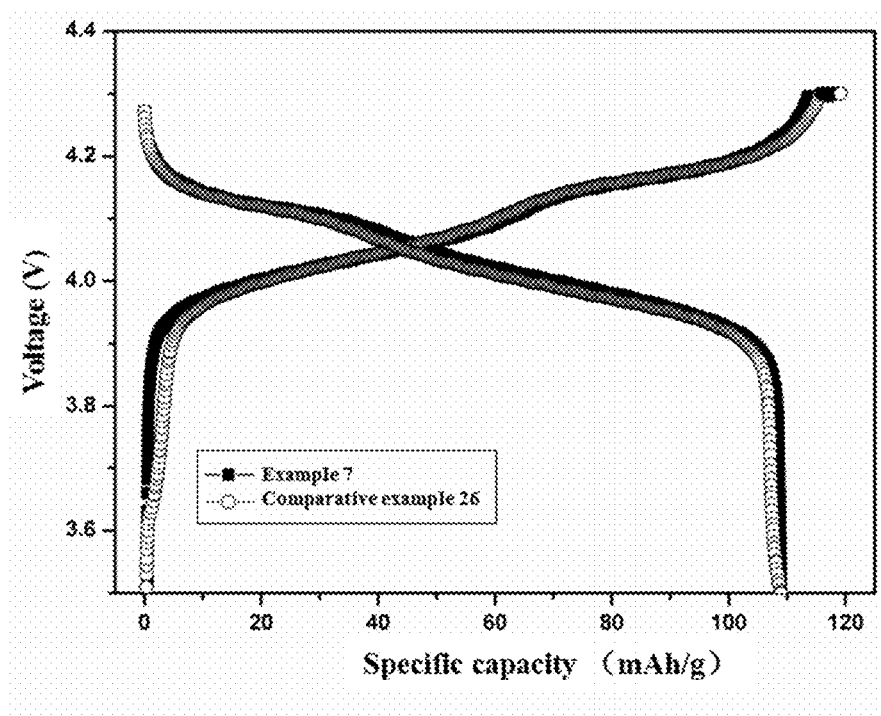
FIG. 12 is an electrical test curve chart of the coin half-cells assembled from the cathode electrode of Example 26 and Comparative Example 7.

FIG. 12 is an electrical test curve chart of the coin half-cells assembled from the cathode electrode of Example 26 and Comparative Example 7. It can be seen from the figure that, the discharge specific capacities of the half-cells made from the cathode electrodes of Example 26 and Comparative Example 7 at a current of 0.2 C is 109.0 mAh/g and 108.9 mAh/g, respectively; this shows that the cathode additive of Example 8 does not affect the electrochemical performance of the lithium manganate lithium ion battery. At the same time, it can be found in the figure that, the electrical curve of Example 26 has a bend with a small amplitude at the voltage platform of 3.6 V~3.4 V, which should be the discharge platform of $Fe^{2+}/Fe^{3+}$ in the lithium manganese iron phosphate, because the cathode additive is added in a less amount and the bending amplitude is smaller.

Figure 13:
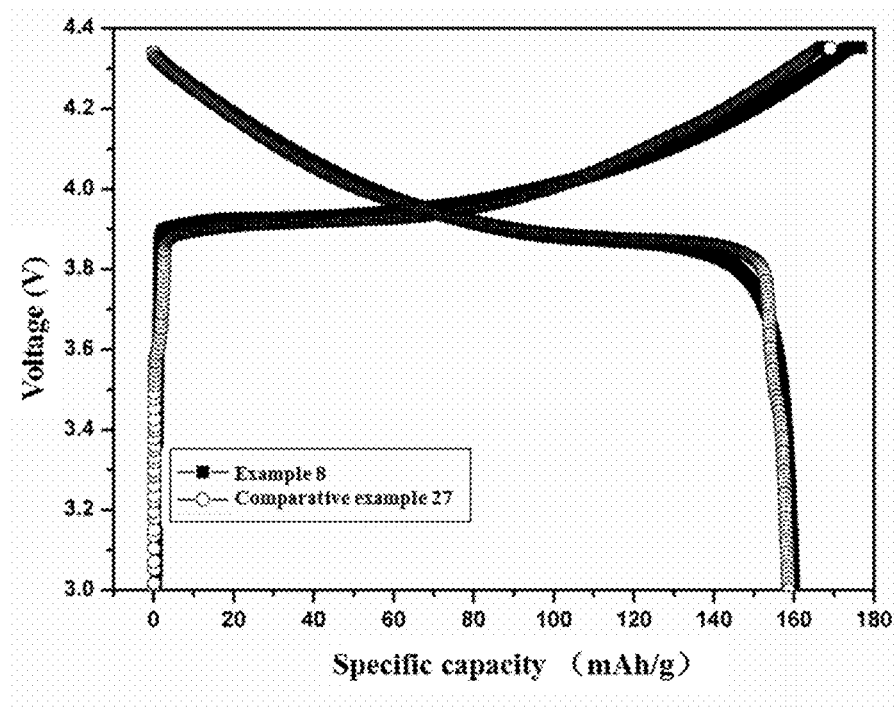
FIG. 13 is an electrical test curve chart of the coin half-cells assembled from the cathode electrode of Example 27 and Comparative Example 8.

FIG. 13 is an electrical test curve chart of the coin half-cells assembled from the cathode electrode of Example 27 and Comparative Example 8. It can be seen from the figure that, the discharge specific capacities of the half-cells made from the cathode electrodes of Example 27 and Comparative Example 8 at a current of 0.2 C is 160.0 mAh/g and 158.7 mAh/g, respectively; this shows that the cathode additive of Example 9 does not affect the electrochemical performance of the lithium cobaltate lithium ion battery. At the same time, it can be found in the figure that, the electrical curve of Example 27 has a bend with a small amplitude at the voltage platform of 3.6 V~3.4 V, which should be the discharge platform of $Fe^{2+}/Fe^{3+}$ in the lithium manganese iron phosphate, because the cathode additive is added in a less amount and the bending amplitude is smaller.

Figure 14:
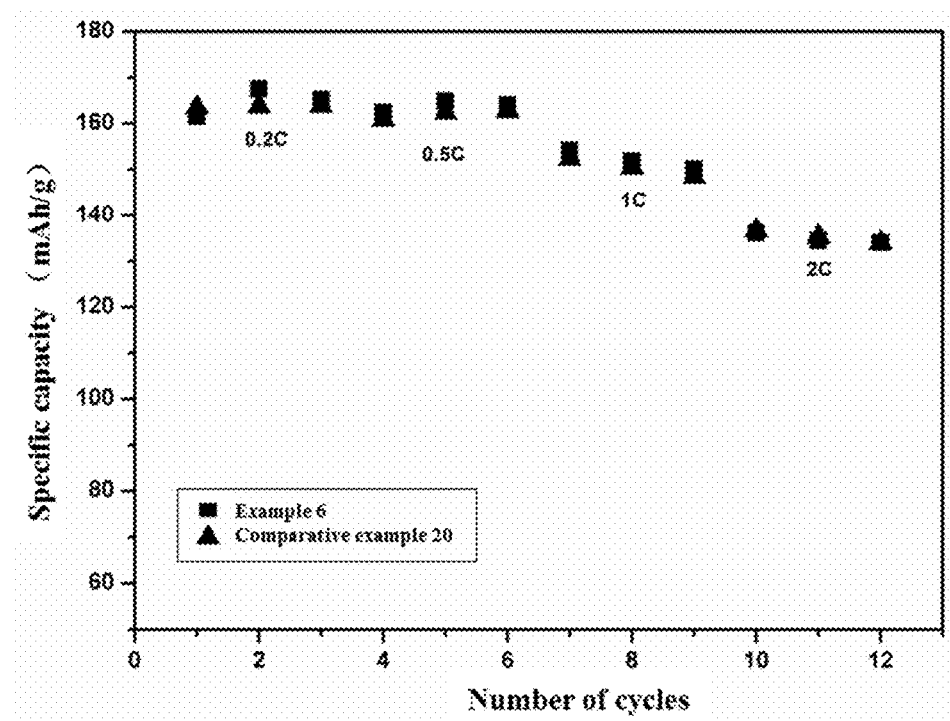
FIG. 14 is a comparison diagram of the rate test of the coin half-cells assembled from the cathode electrode of Example 20 and Comparative Example 6.

FIG. 14 is a comparison diagram of the rate test of the coin half-cells assembled from the cathode electrode of Example 20 and Comparative Example 6. The two types of coin cells were tested three cycles of charge-discharge tests at currents of 0.2 C, 0.5 C, 1 C, and 2 C, respectively, and these data were counted in the comparison diagram. It can be found from the figure that the rate performance of Example 20 is similar to that of Comparative Example 6. This indicates that the cathode additive of Example 2 does not affect the rate performance of the ternary lithium ion battery.

The cathode electrodes of Examples 19, 21 to 25, Examples 28 to 36, and Comparative Examples 2 to 5 were also assembled into coin half-cells according to the above method. The half-cells made from the cathode electrodes of Examples 19, 21 to 25, Examples 29 to 36, and Comparative Examples 2 to 5 were charged and discharged at a constant current and constant voltage with a current of 0.2 C, 1 C, and 2 C in the range of 2.75 V to 4.3 V, the half-cells made from the cathode electrodes of Example 28 was charged and discharged at a constant current and constant voltage with a current of 0.2 C, 1 C, and 2 C in the range of 3.0 V to 4.3 V. Wherein, the discharge specific capacities of the half-cells made from the cathode electrodes of Example 19 to Example 36 and Comparative Example 2 to Comparative Example 8 with a current of 0.2 C, 1 C, and 2 C are shown in Table 5.

TABLE 5

|  | specific discharge capacity (mAh/g) at 0.2 C | specific discharge capacity (mAh/g) at 1 C | specific discharge capacity (mAh/g) at 2 C |
| --- | --- | --- | --- |
| Example 19 | 167 | 155 | 139 |
| Example 20 | 163.9 | 153.0 | 136.8 |
| Example 21 | 176.2 | 162.3 | 144.5 |
| Example 22 | 150.8 | 141.0 | 133.6 |
| Example 23 | 200.4 | 191.8 | 182.8 |
| Example 24 | 137.4 | 131.1 | 116.8 |
| Example 25 | 198 | 186.4 | 175.4 |
| Example 26 | 110.3 | 100.5 | 89.2 |
| Example 27 | 145.0 | 140.4 | 130.4 |
| Example 28 | 116.3 | 104.3 | 92.1 |
| Example 29 | 199.3 | 191.5 | 180.2 |
| Example 30 | 197.0 | 182.2 | 173.2 |
| Example 31 | 195.6 | 177.7 | 170.2 |
| Example 32 | 204.6 | 191.8 | 182.8 |
| Example 33 | 196.6 | 175.9 | 164.7 |
| Example 34 | 196.2 | 178.0 | 171.0 |
| Example 35 | 164.0 | 153.2 | 137.0 |
| Example 36 | 176.0 | 162.2 | 144.3 |
| Comparative Example 2 | 164.3 | 153.1 | 137.4 |
| Comparative Example 3 | 140.7 | 128.2 | 115.3 |
| Comparative Example 4 | 160.0 | 146.8 | 132.9 |
| Comparative Example 5 | 160.4 | 150.1 | 134.2 |
| Comparative Example 6 | 162.8 | 152.1 | 135.8 |
| Comparative Example 7 | 108.9 | 100.2 | 88.1 |
| Comparative Example 8 | 144.3 | 140.1 | 130.0 |

It can be seen from Table 5 that, the coin half-cells assembled from the cathode electrodes of Example 19 to Example 36 have discharge specific capacities of at least 110.3 mAh/g, 100.5 mAh/g and 89.2 mAh/g at a current of 0.2 C, 1 C and 2 C, respectively, with higher specific discharge capacity.

Wherein, the coin half-cell assembled from the cathode electrode of Example 25 has a specific discharge capacity of at least 198 mAh/g, 186.4 mAh/g and 175.4 mAh/g at a current of 0.2 C, 1 C and 2 C, respectively, which has a higher specific discharge capacity than that of the coin half-cells assembled from the cathode electrodes of Examples 26 to 36.

Wherein, the coin half-cells assembled from the cathode electrodes of Example 20 and Comparative Example 3 has the same conditions except for the different types of additives. However, the coin half-cell assembled from Example 20 has a specific discharge capacity at least of 163.9 mAh/g, 153.0 mAh/g and 136.8 mAh/g at a current of 0.2 C, 1 C, and 2 C, respectively; while the coin half-cell assembled from Comparative Example 3 has a specific discharge capacity at least of 140.7 mAh/g, 128.2 mAh/g and 115.3 mAh/g at a current of 0.2 C, 1 C, and 2 C, respectively, which is far worse than that of Example 20. The reason is that, in Example 20, the lithium manganese iron phosphate with capacity was used as an additive, while in Comparative Example 3, a non-capacity aluminium oxide was used as an additive. If only inorganic materials are used as cathode additives to coat the cathode material, although it can form an artificial passivation layer, reduce the direct contact between the electrolyte and the cathode material, inhibit the dissolution of metal ions, and in extreme cases, it can relieve the irreversible reaction between the cathode material and the electrolyte and thus can make the cathode material have longer cycle and safety stability than the unmodified cathode material, because the inorganic material itself is inert and has no specific capacity, it will reduce the develop of the overallspecific capacity of the cathode material and reduce the energy density of the lithium ion battery. At the same time, after the surface of the cathode material is coated by the inorganic material, the direct contact between the electrolyte and the cathode material is reduced, and the rate performance of the cathode material is also reduced; when lithium manganese iron phosphate is used as a cathode additive, it can not only solve the safety problem of the battery, but at the same time it is a cathode active material itself, which can provide capacity, without significantly reducing the energy density and rate performance of the cathode material. That is, after using the cathode additives containing lithium manganese iron phosphate or using lithium manganese iron phosphate powder, the specific capacity of the cathode materials are all increased, and the rate performances are all better; while after using the cathode additives containing only inorganic materials or using inorganic material powder, the specific capacity of the cathode materials are all reduced, and the rate performances are all poor.

It can also be seen from Table 5 that, expect for the ways of introducing lithium manganese iron phosphate of Example 20 and Comparative Example 4 (the former is in way of making as an additive, and the latter is introducing in a powder) are different, other conditions are the same. However, the specific discharge capacity of the coin half-cell assembled from the cathode electrode of Example 20 is at least 163.9 mAh/g, 153.0 mAh/g, and 136.8 mAh/g at a current of 0.2 C, 1 C and 2 C, respectively; while the specific discharge capacity of the coin half-cell assembled from Comparative Example 4 is only 160 mAh/g, 146.8 mAh/g and 132.9 mAh/g at a current of 0.2 C, 1 C and 2 C, respectively. Obviously, the electrochemical performance of the coin half-cell assembled from the cathode electrode of Comparative Example 4 is far inferior to that of Example 20. The cathode electrode of Comparative Example 4 has a lower specific capacity and poor rate performance, and the cathode electrode of Example 20 has a higher specific capacity and better rate performance. This is because the primary lithium manganese iron phosphate particles in the cathode additive are uniformly coated on the surface of the cathode material, but the lithium manganese iron phosphate powder is only mixed with the cathode material, the structure of the former is conducive to the improvement of the electrical conductivity of the lithium manganese iron phosphate particles, improving the development of the capacity of lithium manganese iron phosphate; the NCM (523)-lithium manganese iron phosphate cathode active material prepared by the fusion pre-coating method and the cathode material using the cathode additive containing lithium manganese iron phosphate have substantially the same specific capacity development and rate performance.

4. Safety Performance Test:

The cathode electrodes pieces produced in Examples 20, 26, 27 and Comparative Examples 6 to 8 were made into soft-pack full-batteries, and the soft-pack full-batteries were subjected to needle-punch and overcharge tests and electrical performance test. Wherein, the results of needle-punch, the results of overcharge test, and the specific capacities at a current of 1 C of the soft-pack full-batteries obtained from Examples 20, 26, 27 and Comparative Examples 6 to 8 are shown in Table 6.

Needle-punch test: a fully charged soft-pack full-battery was spiked using a smooth stainless steel needle with a diameter of 6 mm at a speed of 2.2 cm/s, and observed for 1 hour. No explosion or ignition is a pass.

Overcharge test: the fully charged soft-pack full-battery was charged to 1.5 times the end-of-charge voltage under the specified conditions at a current of 1 C, observed for 1 hour. No explosion or ignition is a pass.

TABLE 6

|  | Needle-punch | Overcharge | Specific capacity (mAh/g) |
| --- | --- | --- | --- |
| Comparative Example 6 | igniting, smoking | igniting, smoking | 150 |
| Example 20 | no apparent reaction, no ignition or smoke | no apparent reaction, no ignition or smoke | 149 |
| Comparative Example 7 | igniting, smoking | igniting, smoking | 94 |
| Example 26 | no apparent reaction, no ignition or smoke | no apparent reaction, no ignition or smoke | 90 |
| Comparative Example 8 | igniting, smoking | igniting, smoking | 148 |
| Example 27 | no apparent reaction, no ignition or smoke | no apparent reaction, no ignition or smoke | 146 |

It can be seen from Table 6 that, the soft-pack full-batteries made from the cathode slurries of Examples 20, 26, and 27 all passed the safety test, while the soft-pack full-batteries made from the cathode slurries of Comparative Examples 6 to 8 all failed the safety test; and the soft-pack full-batteries made from the cathode slurries of Examples 20, 26, and 27 respectively have a specific capacity similar to those of the soft-pack full-batteries made from the cathode slurries of Comparative Examples 8 to 10, which indicates the cathode additives of Example 2, Example 8 and Example 9 have little effect on the specific capacity of the soft-pack full-battery.

Wherein, the cathode materials on the cathode electrodes of Examples 19, 20 to 25, and 28 to 36 have safety performances similar to that of Examples 20, 26, and 27, and will not be repeated here.

Each of the technical features of the above-mentioned embodiments may be combined arbitrarily. To simplify the description, not all the possible combinations of each of the technical features in the above examples are described. However, all of the combinations of these technical features should be considered as within the scope of this disclosure, as long as such combinations do not contradict with each other.

The above-mentioned examples are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. A method for preparing a cathode electrode, comprising the following steps:
    mixing a cathode material, a cathode additive, a binder, a conductive material, and N-methylpyrrolidone to obtain a cathode slurry, a mass ratio of the cathode material to the carbon-coated lithium manganese iron phosphate in the cathode additive is 80:20 to 99:1; and
    preparing the cathode slurry into the cathode electrode;
    wherein the cathode additive comprises, in percentage by mass, 10% to 40% carbon-coated lithium manganese iron phosphate and an organic solvent, wherein the carbon-coated lithium manganese iron phosphate is dispersed in the organic solvent, and a median particle diameter of the carbon-coated lithium manganese iron phosphate is 30 nm to 100 nm.

2. The method according to claim 1, wherein the median particle diameter of the carbon-coated lithium manganese iron phosphate is 60 nm to 80 nm.

3. The method according to claim 1, wherein the cathode additive further comprises an inorganic material with a mass percentage of less than 0.5%, wherein the inorganic material is at least one selected from a group consisting of nano-aluminium oxide, nano-titanium oxide, and nano-magnesium oxide.

4. The method according to claim 1, wherein a mass percentage of carbon in the carbon-coated lithium manganese iron phosphate is 2% to 15%.

5. The method according to claim 1, wherein the organic solvent is at least one selected from a group consisting of N-methylpyrrolidone and N, N-dimethylformamide.

6. The method according to claim 1, wherein the cathode additive further comprises a binder with a mass percentage of less than 2%.

7. The method according to claim 6, wherein the binder is polyvinylidene fluoride or styrene butadiene rubber.

8. The method according to claim 1, wherein the cathode additive further comprises a conductive agent with a mass percentage of less than 10%.

9. The method according to claim 8, wherein the conductive agent is at least one selected from a group consisting of acetylene black, Ketjen black, graphene, and carbon nanotube.

10. The method according to claim 1, wherein a mass percentage of solid composition in the cathode additive is 10% to 45%.

11. The method according to claim 10, wherein the mass percentage of solid in the cathode additive is 25% to 30%.

12. The method for preparing a cathode electrode according to claim 1, wherein the step of mixing the cathode material, the cathode additive, the binder, the conductive material, and N-methylpyrrolidone to obtain the cathode slurry comprises: under a condition of continuous stirring, mixing the binder with the N-methylpyrrolidone, and adding the conductive material, the cathode additive, and the cathode material, to obtain the cathode slurry.

13. The method for preparing the cathode electrode according to claim 1, wherein the cathode material is at least one selected from a group consisting of a nickel cobalt manganese ternary material, a nickel cobalt aluminum ternary material, lithium nickel manganese oxide, lithium manganate, and lithium cobaltate.

14. A cathode electrode prepared by the method for preparing the cathode electrode of claim 13.

15. A lithium ion battery, comprising the cathode electrode of claim 14.

* * * * *